(12) United States Patent  (10) Patent No.: US 7,090,371 B1
Bonar  (45) Date of Patent: Aug. 15, 2006

(54) REMOVABLE HEADLAMP FOR A VEHICLE

(76) Inventor: George Bonar, 306 E. 117 St., Apt. 10L, New York, NY (US) 10035-4905

( * ) Notice: Subject to any disclaimer, the term of this patent is extended or adjusted under 35 U.S.C. 154(b) by 50 days.

(21) Appl. No.: 10/660,877

(22) Filed: Sep. 12, 2003

Related U.S. Application Data

(60) Provisional application No. 60/144,379, filed on Sep. 17, 2002.

(51) Int. Cl.
*F21L 4/08* (2006.01)
*B60L 1/16* (2006.01)
(52) U.S. Cl. .................. 362/183; 362/549; 307/10.8; 315/82; 315/86
(58) Field of Classification Search .............. 362/459, 362/507, 506, 546, 496, 505, 306, 369, 549, 362/183; 307/10.8; 315/82, 86
See application file for complete search history.

(56) References Cited

U.S. PATENT DOCUMENTS

| | | | | |
|---|---|---|---|---|
| 1,656,648 A * | 1/1928 | Woller | ...... | 362/387 |
| 2,009,682 A * | 7/1935 | Stofer | ...... | 362/258 |
| 2,557,872 A * | 6/1951 | Holland | ...... | 362/506 |
| 2,671,848 A * | 3/1954 | Swayne | ...... | 362/549 |
| 3,096,941 A * | 7/1963 | Miller | ...... | 362/183 |
| 3,672,063 A * | 6/1972 | Hopkins et al. | ...... | 33/335 |
| 4,092,580 A * | 5/1978 | Prinsze | ...... | 362/183 |
| 4,713,735 A * | 12/1987 | Hiltman | ...... | 362/183 |
| 4,819,139 A * | 4/1989 | Thomas | ...... | 362/183 |
| 4,825,345 A * | 4/1989 | Stevens | ...... | 362/183 |
| 4,894,755 A * | 1/1990 | Chandler | ...... | 362/506 |
| 5,010,454 A * | 4/1991 | Hopper | ...... | 362/487 |
| 5,077,643 A * | 12/1991 | Leach | ...... | 362/183 |
| 5,521,806 A * | 5/1996 | Hutzel et al. | ...... | 362/486 |
| 5,604,406 A * | 2/1997 | Gaus | ...... | 315/56 |
| 5,645,340 A * | 7/1997 | Colton | ...... | 362/183 |
| 5,696,484 A * | 12/1997 | Kim | ...... | 340/471 |
| 5,727,865 A * | 3/1998 | Caldwell | ...... | 362/485 |
| 6,231,219 B1 * | 5/2001 | Lohss et al. | ...... | 362/486 |
| 6,332,700 B1 * | 12/2001 | Baines | ...... | 362/486 |
| 6,431,734 B1 * | 8/2002 | Curry | ...... | 362/488 |
| 6,742,916 B1 * | 6/2004 | Dunn | ...... | 362/477 |
| 2003/0031023 A1 * | 2/2003 | Hutzel | ...... | 362/494 |

* cited by examiner

*Primary Examiner*—Stephen Husar
*Assistant Examiner*—Ismael Negron
(74) *Attorney, Agent, or Firm*—Bradley N. Ruben

(57) ABSTRACT

A headlamp is used as an emergency light by removably mounting the headlamp and connecting the headlamp to a rechargeable battery source separate from and in addition to the connection to the vehicle electrical system, so that the headlamp is operated normally and when needed is removable and has a separate power source. Such a rechargeable lamp can be mounted in the trunk or elsewhere in the vehicle.

4 Claims, 1 Drawing Sheet

REMOVABLE HEADLAMP FOR A VEHICLE

This application claims priority of provisional application 60/411,379 filed Sep. 17, 2002.

BACKGROUND OF THE INVENTION

1. Field of the Invention

This invention relates to headlamps for vehicles, and more particularly to three different aspects: cushioning against impact; removable for use as an emergency light; and changing the color of the light emitted.

2. The State of the Art

One of the most prevalent problems with headlamps is impact damage during low speed collisions, such as when in a parking lot or in slow moving traffic. Various bumper and other front end structures, such as described in U.S. Pat. Nos. 5,010,456, 5,288,177, 5,651,604, 6,190,030, and 6,331,068, are devised to deform and protect the headlamp during a collision. Various headlamp mounting assemblies, such as described in U.S. Pat. No. 4,356,539, include leaf springs, but such are not designed to provide any significant movement of the headlamp and thus do not cushion the impact. On the other hand, U.S. Pat. No. 4,658,335 describes a rear lamp mounted on a leaf spring and depending from a truck bumper to provide a resilient connection for the lamp. However, there are no aftermarket products than can be used with existing vehicles to retrofit a headlamp to be more resilient to impact.

Regarding vehicles in general, when a driver needs to pull off to the side of the road to fix a flat tire, typically the only lighting available is the ambient lighting from street lamps and oncoming vehicles. Flashlights and similar devices are sold which are powered by batteries, so one must be sure that the batteries are fresh and have not leaked. Other flashlights and similar devices can be powered by DC current available through the cigarette lighter socket, but their light output is relatively limited.

In yet another aspect, the color of the headlamp can make the lighting more effective and/or less distracting/imposing for on-coming traffic. In many European countries, headlamps have a yellow cast, likely because the wavelength is more energetic and can penetrate fog better, and is less blinding that pure white light. Accordingly, it would be beneficial to change the light emanating from the headlamp depending on the driving conditions (weather and ambient/street lighting) and the amount and/or type of oncoming traffic. U.S. Pat. Nos. 4,041,302 and 4,153,928 describe, respectively, a vehicle tail lamp having one color and selecting a different color when the bulb is not energized, and a vehicle tail lamp that appears black when the bulb is not energized. Systems for controlling headlight intensity or energization based on oncoming traffic are well known (e.g., U.S. Pat. No. 5,527,003). U.S. Pat. No. 5,725,296 describes the use of a light pipe as a remote lighting source, and the ability to colorize the light to the remote source, but such a device may not be readily amenable to aftermarket sale where customers are interested more in buying existing lamps or new lamps that can be used in the same manner as the existing lamp.

SUMMARY AND OBJECTS OF THE INVENTION

In one aspect, this invention provides for an aftermarket frame for mounting to or for replacing the existing headlamp frame, the frame supporting the headlamp, providing electrical connection, the ability to aim the headlamp, and a coil spring for absorbing impacts and allowing the headlamp to move into the vehicle.

In another aspect, this invention provides a rechargeable and removable headlamp for use as an emergency light, or for any instance in which movable lighting outside of the car is desired.

In yet another aspect, this invention provides a filter in front of the bulb or the lamp to provide a desired color or to polarize the light, and the driver being able to change the filter, preferably remotely.

DESCRIPTION OF SPECIFIC EMBODIMENTS

The patents mentioned in the Background section are incorporated herein in their entirety, by this reference thereto.

As shown in the aforementioned U.S. Pat. No. 4,356,539, a conventional headlamp housing, when viewed head on, has a generally rectangular geometry and a bore in each corner through which the housing can be secured to the vehicle.

Figure 1:
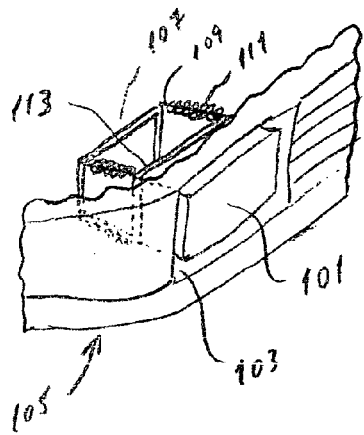
FIG. 1 is an idealized partial cut-away view of a headlamp with an aftermarket frame providing resilience to the headlamp.

In one embodiment of this invention, as shown in FIG. 1, a headlamp 101 is normally positioned in an opening 103 in the vehicle body 105. A frame 107, which can be of a simple rectilinear geometry, is provided and is secured to the body of the vehicle out of the way of any electrical connections. The frame includes parallel arms 109 that can be fastened to the aforementioned bores in a conventional headlamp. On each arm, between the headlamp and the rear of the frame, is a coil spring 111 disposed around the arm and spanning from a stop near the rear of the frame to the headlamp. When the headlamp is impacted, it slides along the arms and is cushioned by the springs. One or more backplates 113 may be provided so that the headlamp is secured to and rests thereon, the backplate(s) engaging the springs. Of course, some impacts will be too quick or too forceful for the headlamp to be cushioned by the frame, but many low speed impacts will be cushioned. In normal operation, the springs are selected or adjusted so that the headlamp is maintained in its forward position and does not move or shake during normal driving conditions (or whatever such conditions are for a particular driving, depending on the terrain, potholes, etc.).

The device shown in FIG. 1 can be sold as an aftermarket product for earlier model cars. As described in the Background section, many late model cars have headlamps housed in a deformable part of the body, or the headlamp housing is otherwise integrated with the body to deform. However, earlier model cars lack such a deformable body or have a lamp housing that is not deformable. With the present invention, a frame and optionally housing can be provided to existing car owners for quick and simple modification of the existing headlamp assembly.

Figure 2:
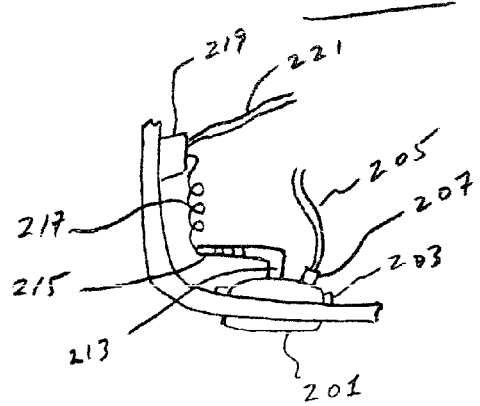
FIG. 2 is an idealized plan view of a removable, rechargeable headlamp.

The embodiment shown in FIG. 2 is an idealized plan view of a headlamp that doubles as a removable emergency light. The headlamp 201 is typically held in place by screws, clips 203, or other mechanical means as is conventional in the art. The power to the headlamp is from wire 205 connected to the electrical system (not shown) which terminate in an electrical connection 207 at the headlamp. Preferably, this electrical connection is detachable by the user. The rear portion of the lamp preferably includes a handle having a stem 213 and a grip portion 215, preferably detachable from the stem during normal driving. The handle accommodates an electrical connection 217 to a device 219 providing power to the headlamp when it is removed from its normal position installed in the car. In various embodiments, the headlamp may have two separate bulbs, one for normal driving, and another for use as an emergency light. The electrical device includes a rechargeable battery charged (though transformers and other devices not shown but well known in the electronic arts) from a connection 221 to the car's electrical system, so that while the car is operating, the lamp battery is being charged. The headlamp can also be held in place by electronically-actuatable mechanical or magnetic components, including electromagnetic, wherein power is provided by the vehicle's electrical system and actuation of release is by means of a passenger-actuated signal preferably sent from within the cabin or under the hood or trunk, and including electromechanical, wherein a stepping motor or motor-driven screw similarly powered is similarly actuated to affect release of the headlamp.

In use, the headlamp is removed from its normal position, the handle is affixed, and the lamp is turned on by a switch (not shown) preferably integrated with the handle. Preferably the lamp is secured in a first housing that is secured to a second housing mounted to the body. The connection between the first and second housings is fixed so that the second housing orientation can be changed to aim the headlamp, but the orientation of the connection between the two housings is fixed so that removing and replacing the "headlamp" does not affect the aim.

As an alternative to using a headlamp, a rechargeable emergency lamp that is detachable from the vehicle can be provided in the vehicle's trunk. As with the embodiment shown in FIG. 2, the vehicle's electrical system is used to charge the battery during normal operation. In such a case, the battery can be integrated with the lamp (as in a flashlight or lantern) and removed in its entirety from a socketed connection, and then replaced after use.

In yet another embodiment, this invention provides for changing the color of the light emanating from the headlamp. Generally speaking, as shown respectively in FIGS. 3A, 3B, and 3C, the color of the light can be changed, respectively, by a polymeric filter moved between rolls (3A), an electrochromic material (3B), and a color wheel disposed within the headlamp (3C). There are various reasons for changing the color of the headlamp, including making the lamp color more yellow when oncoming cars are closer (to minimize glare to the oncoming drivers, and in fog to minimize reflection) and more blue when there is no (or less) oncoming traffic (to provide better lighting).

Figure 3A:
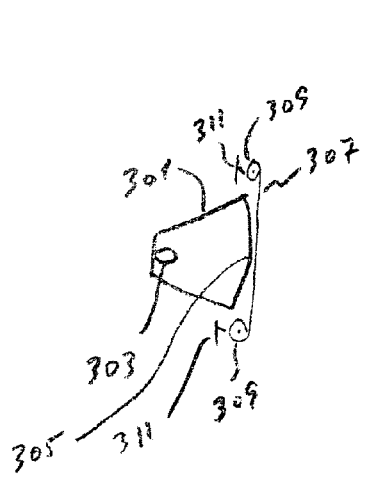
FIGS. 3A and 3B show idealized plan views of filters in front of a headlamp and FIG. 3C shows an idealized cutaway view with a filter wheel within a headlamp.
Figure 3B:
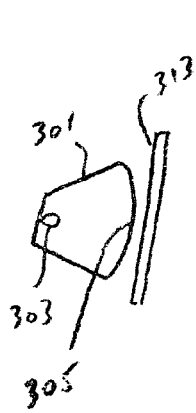

More particularly, FIGS. 3A and 3B show idealized cross sectional views of a headlamp 301, the bulb 303 within the headlamp, and the lens assembly 305 out through which the light is projected. In FIG. 3A is shown a flexible film filter 307 spanning between rollers 309. The film filter can have discrete sections of a specified color so that the wound up on one roller to change the color of the filter in front of the lens. The filter can be moved along the rollers mechanically (the user having to set the color prior to entering the vehicle), or the rollers can be electromechanically controlled from inside the vehicle. The color in front of the lens can be determined by a light sensor, such as one near each roller, so that when both sense the same color then that color is in front of the lens. Inside the car can be corresponding colored LEDs which the driver can select as representative of the color of the filter desired to be in front of the lens. In inclement weather, the length of the film necessary to span the lens can be twice what is needed, and with mechanical cleaners 311 (e.g., brushes, squeegees) in place, the film can be moved back and forth and cleaned without the color changing to the viewer. FIG. 3B depicts a device 313 having an electrochromic material, so that when light passes through the device it is effectively filtered. Electrochromic materials are well known. The device 313 is electrically powered through the vehicle's electrical system, and is controlled by the driver (such as the aforementioned colored LEDs to select the color desired on the device if transmissive, or the opposite color if subtractive).

Figure 3C:
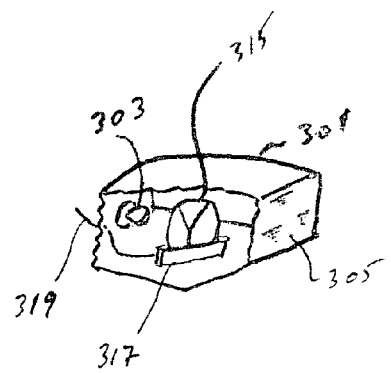

FIG. 3C shows an idealized cut away view of typical headlamp but having a small color wheel 315 disposed between the bulb and the lens. The color wheel is held in a retaining and rotating device 317, controlled and powered through a connection 319.

The foregoing description is meant to be illustrative and not limiting. Various changes, modifications, and additions may become apparent to the skilled artisan upon a perusal of this specification, and such are meant to be within the scope and spirit of the invention as defined by the claims. All of the patents mentioned above are incorporated herein by reference thereto.

What is claimed is:

1. A rechargeable and removable emergency lamp and headlamp for a motorized vehicle having an internal combustion engine and an electrical system therefor, comprising:
    a lamp having a handle and electrical connections to a first rechargeable battery and to said electrical system, said lamp positioned and used as a headlamp;
    said first rechargeable battery suitable for powering said lamp and not suitable for said electrical system, wherein the lamp has a first electrical connection to the first rechargeable battery for powering the lamp and having a second electrical connection to the vehicle's electrical system, said electrical system including a second rechargeable battery, the first rechargeable battery having a third electrical connection to the vehicle's electrical system for recharging the battery; and
    a first housing in which the lamp is removably retained, the lamp being removable from said housing for use as an emergency light, and when the lamp is in use as an emergency light said first and third electrical connections remain intact and said second electrical connection is disconnected.

2. The lamp of claim 1, wherein the first housing joins to a second housing attached to the body of the vehicle.

3. The lamp of claim 1, wherein the handle is removable.

4. The lamp of claim 3, wherein the first electrical connection to the lamp runs through the handle.

* * * * *